March 15, 1966   H. E. WEISS ETAL   3,240,527
VEHICLE BODY INTERIOR ARRANGEMENT
Filed May 13, 1964   4 Sheets-Sheet 1

INVENTORS.
James S. Svenson
Howard E. Weiss
BY Harness and Harris
ATTORNEYS

March 15, 1966   H. E. WEISS ETAL   3,240,527
VEHICLE BODY INTERIOR ARRANGEMENT
Filed May 13, 1964   4 Sheets-Sheet 3

INVENTORS.
James S. Svenson
Howard E. Weiss.
BY
Harness and Harris
ATTORNEYS.

United States Patent Office 3,240,527
Patented Mar. 15, 1966

3,240,527
VEHICLE BODY INTERIOR ARRANGEMENT
Howard E. Weiss, Bloomfield Hills, and James S. Svenson, St. Clair Shores, Mich., assignors to Chrysler Corporation, Highland Park, Mich., a corporation of Delaware
Filed May 13, 1964, Ser. No. 367,151
20 Claims. (Cl. 296—24)

This invention relates to a vehicle body and particularly to the unique arrangement of a rear second seat in a sports car body skin such that the utility vehicle advantages of a suburban vehicle are attractively blended into a true sports car body shell to give a novel dual purpose vehicle.

The trend towards sports cars by all age groups has been very strong during the last several years and there is every indication that this trend will continue to gain impetus. At the same time early marriages are on the increase and we have large numbers of young married couples, both with and without children, who find frequent use for the suburban type vehicle for either daily living, business requirements, vacation traveling or the like. This large group of prospective car buyers have already shown a definite desire for the so-called sports car styling even though, up to the present, there may have been certain functional and practical disadvantages of such styling. The body design herein disclosed combines the utility, space and multiple seating advantages of the suburban vehicle with a true sports car body. The body arrangement is such that, while appearing as a bucket seat sports car, this vehicle by a simple, easy rearrangement of the second seat back and the security panel (see FIGS. 4 and 5), is readily convertible into a load carrying utility vehicle and/or a sleeper unit that will comfortably accommodate at least three sleepers in its rear expansible utility compartment.

This dual purpose vehicle has the exterior lines of a sports car, without the interior restrictions that often characterize a car of this type. It will seat five passengers with ease. Versatility is provided by a spacious rear utility compartment of novel design. This vehicle is an attractive, useful automotive package with a broad marketing appeal that extends from the sportsman to the family man.

It is a distinctive 2-door hardtop, specialty car. Its outer lines are characteristic of a sports car, yet its interior combines front personalized seating with a versatile rear compartment that can be converted to many uses.

Its exterior styling is dominated by a fast-back design (see FIGS. 1 and 4) in which the roof line blends together with an extra large rear window to form a continuous arc from the windshield down through the trunk compartment.

Beneath the vast expanse of the rear glass, a large, functionally designed utility area (see FIGS. 4 and 5) is present. Notably absent is a package shelf. Instead, there is a flat, carpeted floor which can be extended to a seven-foot length by folding down the rear seat back and dropping the hinged security panel at the rear of the utility area. The hinged security panel, when latched, angles upward to fit snugly beneath the rear window rear garnish beam. It is called a security panel because the latch means is operable only from within the trunk compartment. When the security panel is latched in its upstanding position the contents of the trunk compartment are effectively sealed off from the interior passenger compartment of the vehicle. When unlatched, the panel is folded rearwardly into the trunk where it seats flat over the concealed tire well. A secondary advantage of the security panel is that, when unlatched, complete access to the utility compartment can be gained from outside the car through the opened trunk. The entire utility area is carpeted, including the wheelhousings which form the inner sides.

The rear or second seat-back, when folded forward (see FIG. 6), is fastened down to the sill risers by two straps. When the rear seat is placed in the upright position (see FIG. 7), a pivotally mounted bar along the top of the seat-back has its end portions snap into and lock against latch striker plates attached to the rear fender wells.

Figure 6:
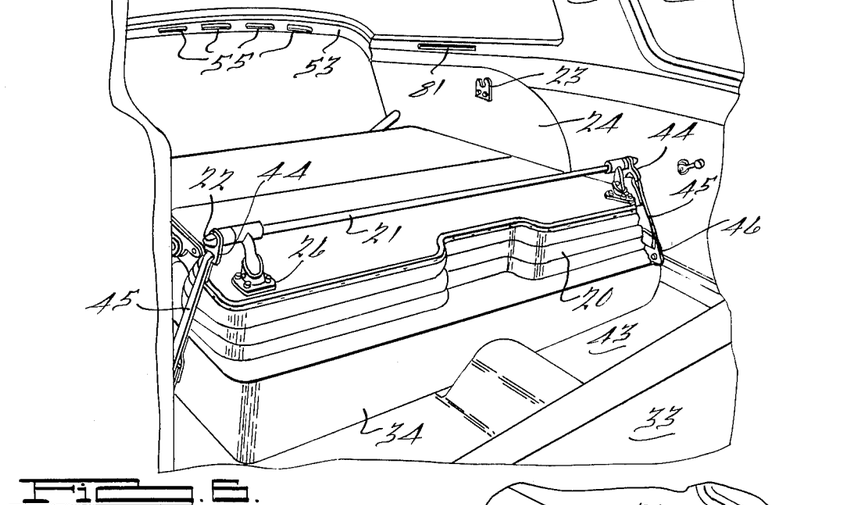
FIG. 6 is a fragmentary perspective view showing the interior of the vehicle body when the second seat back and the security panel have been lowered to substantially horizontal position, this view being taken inside the vehicle body looking from the front of the vehicle to the rear end thereof.
Figures 9, 11:
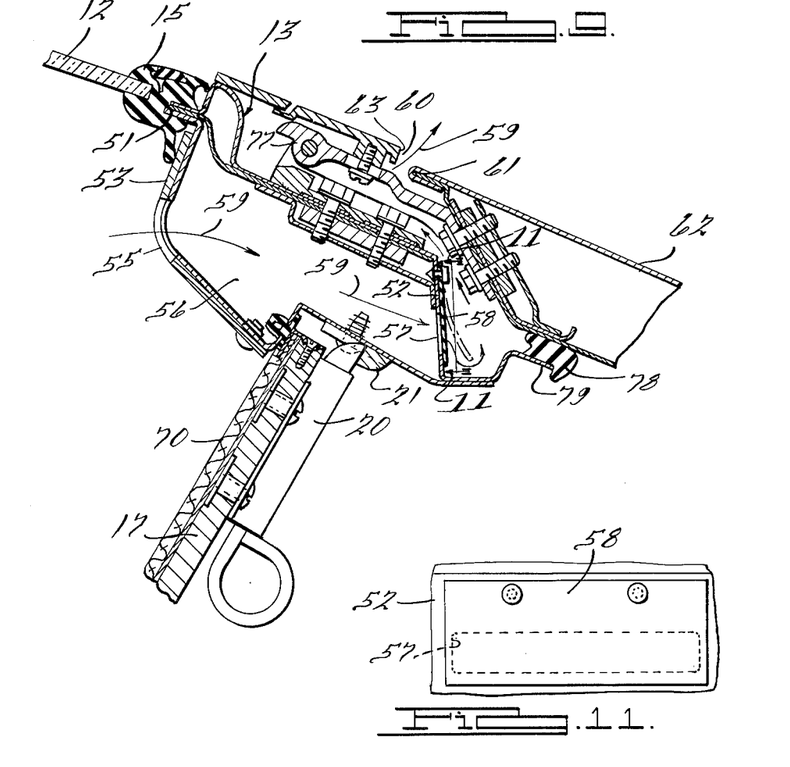
FIG. 9 is an enlarged fragmentary sectional elevational view showing the hollow garnish beam body structural element at the rear edge of the vehicle body rear window, this view being taken along the line of and in the direction of the arrows 9—9 applied to FIG. 4.
FIG. 11 is a fragmentary elevational view showing the garnish beam air exhaust valve structure, the view being taken along the line of and in the direction of the arrows 11—11 applied to FIG. 9.
Figure 10:
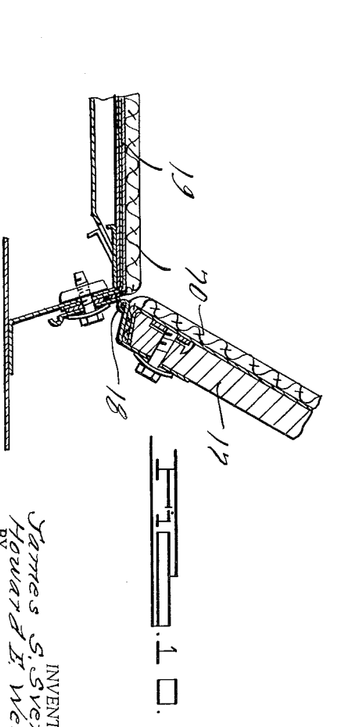
FIG. 10 is another enlarged fragmentary sectional elevational view showing the hinge mechanism at the lower edge of the security panel, this view being taken along the line of and in the direction of the arrows 10—10 applied to FIG. 4.

Another innovation in the utility area is the four rectangular air slots at the base of the rear window (see FIG. 6). These slots are used to exhaust the passenger compartment air, funneling it into a special garnish beam chamber forward of the deck lid (see FIG. 9) from which it is allowed to escape into the atmosphere. By promoting this flow of air from the front to rear of the passenger compartment, the rear window normally is kept clear, and heated air during cold months is efficiently transferred throughout the car interior. The specific rear window defogger means herein disclosed is specifically claimed in the co-pending application of Robert C. Ziegenfelder et al., Serial No. 384,839, filed July 24, 1964.

Inasmuch as the usual diagonal braces and rear seat shelf panel structure are eliminated by the utility compartment behind the rear seat, a network of specially designed supports (see FIG. 3) makes up the body structure surrounding the rear window to provide the necessary body torsional rigidity. Of primary importance is the arch or truss, a reinforced box section that is anchored to the wheelhousings and forms the structure for the C-pillars and the top of the rear window. Special reinforced sections also fit over the floor pan and flange around the rear wheelhousings. To keep the lower part of the rear glass rigid and take up the load from the deck hinging, another reinforced hollow box section is used as a cross brace along the upper deck panel. This latter box section can also serve as a body interior air exhaust duct if desired.

It is a primary object of this invention to provide a five passenger, front and rear seat vehicle body of sports car design wherein the rearrangeable mounting of the rear seat is such that the rear end of the body interior can be readily converted to a utility vehicle simulating a suburban vehicle.

It is another object of this invention to provide a fast back sports car body having front and rear seats wherein the rear seat has a utility storage area immediately rearwardly thereof that is normally separated from the rear end trunk area by a movable security panel.

It is still another object of this invention to provide a sports car body having a movable security panel arranged between and selectively isolating the trunk area from the passenger compartment. This security panel is arranged such that the panel may be pivotally lowered to a horizontal position to provide a continuation of the load floor in the kick-up area that is positioned forwardly of the security panel.

It is still a further object of this invention to provide a folding seat back for the second seat of a vehicle that has a latch bar on the rear side thereof that serves to latch the folding seat back in erected position and to also act as a load positioning safety bar obstructing forward shift of the vehicle interior load against the front seat backs when the second seat back is folded down to a horizontal position.

It is still another object of this invention to provide a novel arrangement for heating and ventilating the interior of a vehicle body and to particularly include improved means to clear and defog a large rear window area such as the rear window of a fast back type vehicle.

It is still another object of this invention to provide a novel rear window structural supporting beam that includes suitable vehicle body interior air exhaust conduit structure such that the back pressure within the closed vehicle body will be sufficiently low to give improved interior heating and ventilating and, in addition, improved sealing between the windlace surrounding all window and door openings and the adjacent window or door.

Other objects and advantages of this invention will be readily apparent from a reading of the following description and a consideration of the related drawings wherein:

As previously indicated the several inventions included in this application are associated with a so-called fast back vehicle body of the two door hardtop type. While such a body is generally considered to be of the sports car design, it is believed that the novel seating and other structural body arrangements disclosed herein are such as to make them adaptable for use in any suburban type vehicle or in any sports car vehicle. The particular vehicle body B shown in these drawings includes a front seat that may comprise two, separately adjustable, side-by-side, bucket-type seats or in the alternative a single bench type seat. The specific front seat arrangement can be varied without materially effecting the inventions to be described hereafter.

Figures 1, 2:
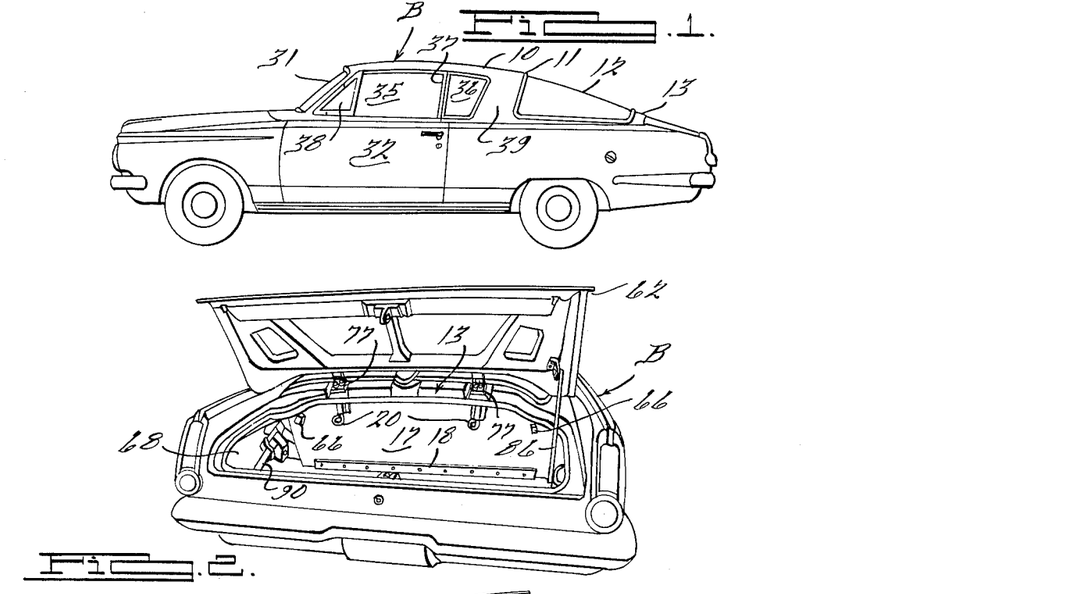
FIG. 1 is a side elevation of a two door, hardtop, fast back motor vehicle embodying this invention.
FIG. 2 is a fragmentary perspective view of the rear end of the vehicle body shown in FIG. 1, wherein the trunk lid is shown in open or elevated position.

FIG. 1 shows a so-called two door, fast back vehicle body B wherein the rearwardly and downwardly sloping hardtop roof 10 extends from the top of the windshield 31 to the enlarged rear window 13. The rear edge 11 of the roof 10 is preferably rearwardly of the body second seat back 20 so that the passengers on the second seat 34 will be shielded from the sun by the overlying opaque roof 10. The large single doors 32 on each side of the vehicle body B permit easy access to the front seats 33 which may be individually adjustable bucket seats or a bench type seat with a pivoted back section. Also the large doors 32 permit easy access to the second or rear seat 34. From FIG. 4 it is believed to be clear that there is more than enough space to easily enter the second seat 34 whether the back of the front seat 33 is pivoted forwardly or left in its normally erect position.

Figure 4:
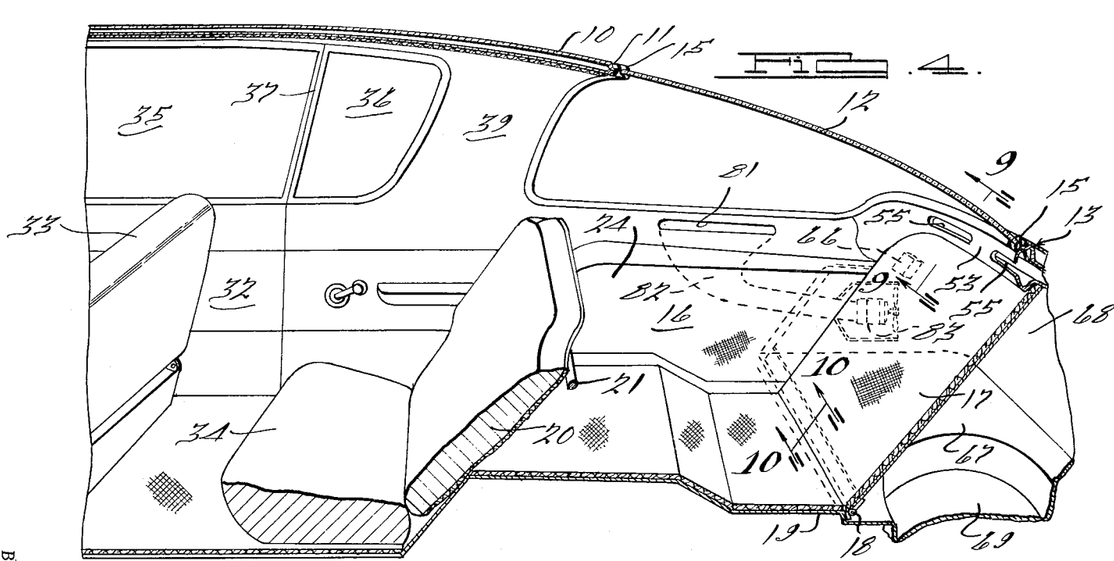
FIG. 4 is an enlarged fragmentary sectional elevational view extending longitudinally of the vehicle body shown in FIGS. 1 through 3 and disclosing the interior of the vehicle body with the second seat and the security panel in raised or erected positions.

From FIGS. 1 and 4 it is also obvious that maximum visibility is provided for all passengers of the disclosed type of vehicle because of the novel window arrangement. There is no B post or middle post located between the rear edge of the vertically adjustable door window 35 and the vertically adjustable quarter panel window 36. A trim sealing channel 37 may be mounted to extend along the rear vertical edge of the door window 36 to sealingly engage the forward vertical edge of the quarter panel window 36. Obviously when the door window 35 is lowered then the edge seal 37 is lowered into the door 32 such that it cannot provide an obstruction to vision from within the vehicle body. The front doors 32 each include the usual pivotally mounted, adjustable vent windows 38. Rearwardly of each of the quarter panel windows 36 is a C post or rear post 39. The side C posts 39 provide the legs of the inverted U-shaped roof truss or beam 40. Beam 40 cooperates with the garnish beam 13 located rearwardly of beam 40 to provide the major support for the large rearwardly and downwardly sloping rear window 12. Window 12 is preferably of heat absorbing glass or some similar transparent material.

Looking now at FIGS. 4 through 8 in particular, it will be noted that vehicle body B includes a rearwardly and downwardly sloping arcuate roof section 10 that terminates at its rear edge 11 where the roof arc blends into a large rear window section 12. The rear window 12 is of substantially an inverted U-shape in cross sectional configuration and it tapers rearwardly and downwardly to the garnish beam rear window support member 13. Suitable resilient window mounting seal strips 15 connect the rear window glass 12 to the surrounding vehicle body structure. There is no body shelf member or diagonal structural body bracing located at the rear or beneath the rear edge of the rear window 12 such as is usually the case with conventional vehicle body designs. It is apparent, particularly from FIG. 4, that the rear window 12 overlies the utility storage area that is generally designated by the reference numeral 16. At the front of the utility area 16 is the foldable second seat back 20 that normally provides an upstanding front wall element for the utility area. At the rear of the utility area 16 is the security panel 17 that normally provides an upstanding rear wall for this area. The security panel 17 is hingedly connected at 18 to the rear edge portion of the kick-up floor 19. A latch means 20 (see FIG. 9) is provided at one or more locations along the upper edge of the security panel 17 so that the security panel may be latched to keeper members 21 carried by the garnish beam member 13.

Figure 5:
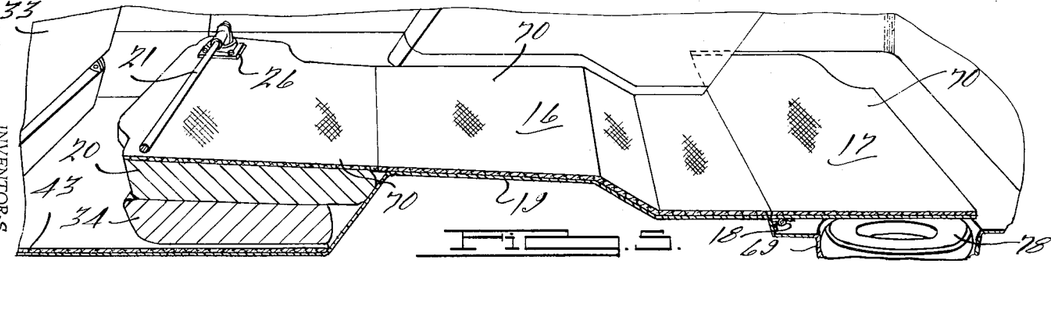
FIG. 5 is another fragmentary sectional elevational view, similar to FIG. 4, but showing the second seat back and the security panel each lowered to substantially horizontal positions so as to provide a continuous load bearing floor that extends from the rear of the front seat to the rear end of the vehicle body.

The upper or exposed face of the security panel 17, the top face of the kick-up floor section 19 and the rear side of the second seat back 20 are all preferably covered with carpeting material 70 such that when the rear seat back 20 and the security panel 17 are lowered to substantially horizontal positions, as shown in FIG. 5, there is a continuously carpeted, relatively long, floor area that extends from the rear side of the front seat 33 to the rear end of the vehicle. This continuously carpeted area not only presents an attractive, luxurious sports car appearance in this multi-purpose vehicle but at the same time the carpeting serves a function of providing a cushioned surface that lends itself to use as a bed area for the vehicle passengers when the vehicle is used for camping purposes. Also this expansive carpeted area provides a relaxing area for non-drivers during relatively long trips.

Figures 7, 8:
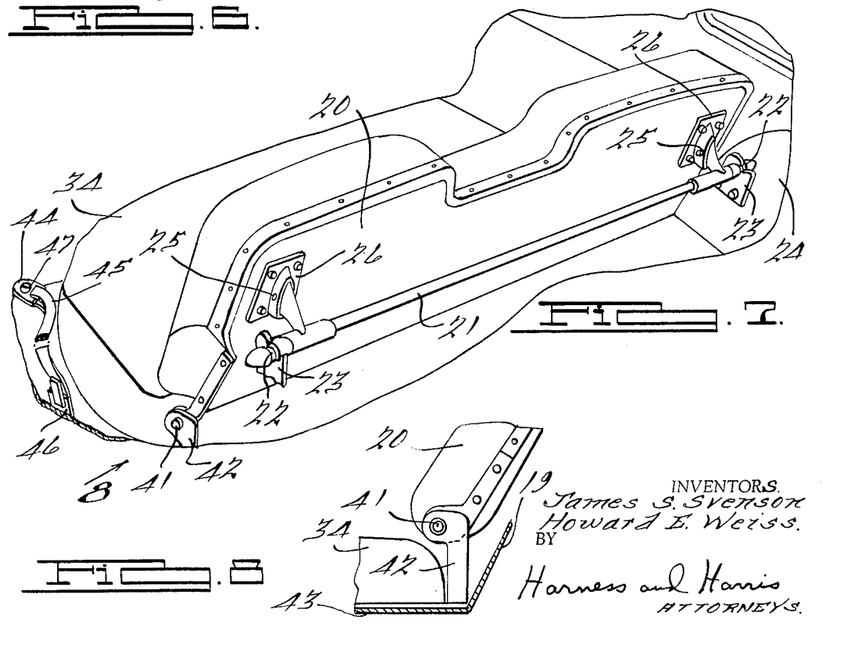
FIG. 7 is a fragmentary perspective view looking towards the rear side of the second seat back when it is latched in erected passenger supporting position.
FIG. 8 is a fragmentary sectional elevational view of the hinge mechanism at one end of the second seat back, the view being taken in the direction of the arrow C applied to FIG. 7.

As can be seen from FIGS. 4 through 7 in particular, the folding second seat back 20 carries a latch bar 21 on its rear surface which bar has its cone-like end portions grooved to provide latching portions 22 engageable with keeper plates 23 mounted on the rear wheel housings 24. Latch bar 21 is pivotally connected at 25 to mounting plates 26 carried by the rear side of the seat back 20. The pivot connections 25 for the ends of the latch bar 21 preferably include spring means or the like, that tend to urge the latch bar 21 downwardly or in a clockwise direction so as to maintain the bar latching portions 22 in engagement with the keeper plates 23. It is believed to be obvious that because the latch bar 21 extends from side-to-side of the second seat back 20 it is then possible to unlatch the second seat back 20 from the keeper plates 23 from either side of the vehicle with relative ease. When the seat back 20 has been released from its connection with the keeper plates 23, the seat back 20 may be folded forwardly and downwardly into a substantially horizontal position as shown in FIGS. 5 and 6. The folding of the seat back 20 to the lowered substantially horizontal position can be accomplished because the second seat back 20, see FIGS. 7 and 8, is pivotally connected at 41 adjacent its lower edge to a support post 42 affixed to the vehicle body floor section 43. Obviously, variations in the specific pivot structure for rear seat back 20 may be utilized without departing from the spirit of the disclosed inventions so long as such pivot means permit the seat back 20 to fold forwardly and overlie the second seat cushion element 34.

Looking particularly at FIG. 6, it will be noted that the latch bar 21 mounted on the rear side of the foldable second seat back 20, serves a multiplicity of functions. In addition, to serving as the latch means for anchoring the seat back 20 in its erected or substantially vertical passenger supporting position, the latch bar 21 also serves as a load obstructing bar that prevents forward shift of any load in the rear portion of the vehicle utility area when the seat back 20 has been folded downwardly to the position shown in FIG. 6. The bar 21 therefore serves a very valuable safety function in addition to providing a means to permit the tying down of various types of loading that may be carried in the rear portion of this vehicle body when it is converted for utility use. The grooved ends 22 of the latch bar 21, as previously pointed out, not only provide the latching means to engage the keeper plates 23 when the seat back 20 is in its erect position, but in addition, the grooved end portions 22 of the latch bar 21 provide engaging means for the anchor straps 45 that tie down the seat back 20 in its lowered horizontal position. Straps 45 include apertured latch plates 44 that are carried on the free ends of the anchor straps 45. Anchor straps 45 each have their lower ends fixedly connected to an anchor plate 46 mounted on the adjacent side riser for the second seat floor section 43. The latch plates 44 connected to the free ends of the straps 45 each include an aperture 47 that is designed to receive the grooved, cone-shaped adjacent end of the latch bar 21. The edges of the plate apertures 47 seat in the grooves 22 on the ends of the latch bar 21. It is thus seen that the straps 45, which can be adjustable in length, provide a means for firmly anchoring the seat back 20 in its load receiving position as disclosed in FIG. 6. When it is desired to raise the folded seat section 20 to its normal passenger supporting erected position, it is merely necessary to slip the strap latch plates 44 off the ends of the latch bar 21 and to then pivot the seat back 20 to erected position. The released anchoring straps 45 are intended to be stored on the vehicle floor adjacent the side of the second seat cushion 34 where they will be substantially concealed and out of the way, yet readily available for future use.

Figure 3:
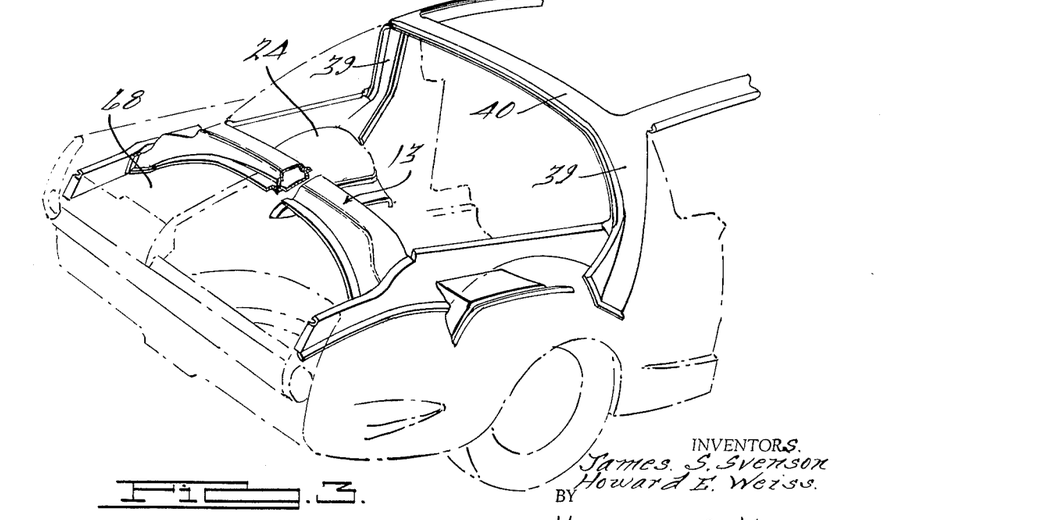
FIG. 3 is another fragmentary perspective view of the vehicle body shown in FIG. 1 with portions thereof broken away and shown in section or by broken line so as to more clearly bring out certain body structural elements and arrangements and contribute materially to the invention embodied in this vehicle.

Looking now at FIGS. 3 and 4 it will be noted that the specific body structure disclosed eliminates the shelf panel that is usually positioned adjacent the lower edge of the vehicle body rear window. Not only is the shelf member eliminated but also there are no vertical structural braces or panels extending from the garnish molding beam 13 to the floor section beneath the beam 13. This entire area is kept free of structural members so that the security panel 17 can have unimpaired swinging movement between its erect and horizontal positions. Also it is desired to have a clear maximum size opening between the utility area 16 and the trunk area 68 when the security panel 17 is lowered.

In this vehicle body it will be noted the lower rear edge of the rear window 12 (see FIG. 9) is mounted in a resilient sealing strip 15 carried by a fence portion 51 that forms a part of the garnish molding beam 13. This transversely extending garnish beam 13 is hollow and it is utilized not only as a major structural member to rigidify the rear end portion of the vehicle body, but, in addition, beam 13 provides an air flow conduit that facilitates the heating and ventilation of the vehicle body interior. This conduit beam 13 also facilitates cleaning and defogging of the relatively large rear window 12. As can be noted from FIGS. 4, 6 and 9, the interior garnish rail portion 53 of beam 13, that extends along the interior lower edge of the rear window 12, is pierced by a plurality of elongated slot-like openings 55. These slots 55 permit air, that is being circulated within the vehicle body, to be exhausted from the body interior to the conduit chamber 56 that is formed by the hollow interior of the garnish beam 13. The air passing into the conduit chamber 56 can pass through the one-way valve controlled exhaust slots 57 formed in the rear face 52 of the garnish beam 13 (see FIG. 9) because these slots 57 are controlled by one-way rubber flap valve plates 58. Air following the path of the arrows 59 will be exhausted to the atmosphere through the space 60 that extends between the upper edge 61 of the trunk lid 62 and the spaced adjacent edge 63 of the garnish beam 13. It has been found that not only does the arrangement of the exhaust slots 55 provide a means that prevents fogging of the large rear window 12, due to the air circulation thereacross, but in addition, exhaust slots 55, 57 tend to reduce the back pressure within the vehicle body so that air circulation across the car heater coils (not shown) is increased and there is a more efficient and faster heat transfer in the car heating system. Because of the one-way flaps 58 it is believed to be obvious that smoke, dust and similar foreign gases exteriorly of the vehicle cannot bleed back into the vehicle interior from the atmosphere when the pressure within the vehicle body is reduced. Valve flaps 58 are also effective to provide a means opposing noise transfer to the vehicle interior through slots 55. The specific details of the air flow control associated with garnish beam 13 are claimed in detail in the aforementioned co-pending application of Robert C. Ziegenfelder et al. Serial No. 384,839 filed July 24, 1964.

Looking now at FIGS. 2, 4, 5, 9 and 10 in particular it will be noted that when the second seat vehicle back 20 is latched in erect position and the security panel 17 is latched in upright position that a very large deep utility area 16 is provided between the rear of the second seat back 20 and the front of the security panel 17. This utility area has many uses and because it is large and carpeted across all exposed surfaces thereof, including its opposite sides which are formed by the wheel housings 24, this utility area provides an insulated space where youngsters may conveniently travel with maximum safety and enjoyable freedom of movement. Also, because of the carpeted nature of this utility area, fragile or other articles that might be injured by scratching or the like, are ideally suited for storage in this utility area. If it should be desired to increase the size of the utility area 16, there are three alternatives readily available. First, the folding second seat back 20 can be unlatched and rotated forwardly to a substantially horizontal position so as to provide a utility area that extends from the back of the front seat 33 to the front of the erected security panel 17. Here again a completely carpeted and trimmed utility area is provided that can be reached from within the vehicle body through either of the front doors 32. This particular utility arrangement would require that the second seat not be used as a passenger carrying seat at this particular time. However, if there should be as many as five passengers in the vehicle so that the second seat would have to be used for passengers, then if a utility area greater than the normal area 16 should be desired, it is merely necessary to open the trunk lid 62, as shown in FIG. 2, and to release the security panel latches 20 so that the security panel 17 can be pivoted rearwardly to a substantially horizontal position similar to that shown in FIG. 5. With the arrangement now obtained the utility area extends from the back of the second seat completely through the trunk area 68 and it can be reached either through the trunk lid opening or through the vehicle body interior. The security panel 17 has a strip-type hinge 18 along its lower edge that connects it to the rear edge of the kick-up floor section 19. Security panel 17 also has one or more spacer blocks 66 on its rear face that seat upon the trunk floor 67 when the security panel is moved to its lowermost position. Recessed in the floor 67 of the trunk compartment 68 is a well 69 adapted to receive the vehicle spare tire 78.

It is believed to be obvious that if the maximum utility space is desired that then both the seat back 20 and the security panel 17 are both moved from their erected positions to their substantially horizontal positions as shown in FIG. 5. Under such circumstances the utility area can be reached either from within the vehicle by means of the doors 32 or through the trunk by raising the trunk lid 62 as indicated by FIG. 2. When the second seat back 20 and the security panel 17 have been folded to their substantially horizontal positions as shown in FIG. 5, a 7 foot long utility area is provided that will provide a generous load carrying space or sleeping area while at the same time having a passenger carrying front seat forwardly of this large utility space that will adapt itself to two or three passengers depending on the type of front seat installation used in the vehicle. Throughout the conversion of the seating to the various utility arrangements, the vehicle continuously retains its sleek sports car appearance.

Considering FIG. 4, it will be noted that in addition to having a carpeted relatively large size utility area between the erected second seat back 20 and the erected security panel 17 there is still a sizable trunk area 68 rearwardly of the security panel in which articles can be locked up and not reached through the interior of the vehicle. This feature is particularly advantageous as it excludes trespassers from the trunk. This can be very important in preventing thefts from the vehicle as when the vehicle would be left on a parking lot with the interior required to be left open at all times so that the parking lot attendant may shift the vehicle around on the parking lot. Thus it is seen that this vehicle body arrangement not only provides a utility area 16 at all times, regardless of its various passenger seating arrangements, but in addition, a locked trunk area 68 is also available for safe storage of valuables. Notwithstanding the various utility arrangements, the vehicle still retains its fast-back sports car styling at all times.

To accommodate increased forced fresh air circulating across the large rear window 12, provision is made (see FIG. 4) for the mounting of a separate electric motor driven fan unit 83 in the trunk area 68. This fan 83 is connected by a flexible or rigid conduit 82 to the elongated slot 81 in the body interior wall portion that extends along the lower side edge of the rear window 12. The slot 81 on the opposite side of the vehicle (not shown) would normally serve as an exhaust slot for the air passed across the inside of the window 12 by the action of fan 83. Slots 81 may be formed with knock out plug covers to keep the body interior better sealed if a circulation fan 83 is not required.

The garnish beam 13 (see FIGS. 3 and 9) that mounts the rear end of the rear window 12 and provides structural bracing for the rear end sheet metal of the body B also serves as the mounting bar for the trunk lid 62. From FIGS. 2 and 9 it is clear that beam 13 mounts a pair of strap hinges 77 that each have one leaf bolted to the beam 13 and the other leaf bolted to the trunk lid 62. A suitable sealing strip 78 is compressively engaged between the trunk lid 62 and the flange 79 on the beam 13, when the trunk lid is closed, to seal the trunk area 68 from rain, dirt or other foreign matter. A brace bar strut 86 is used in the conventional manner to support the trunk lid in raised or open position as shown in FIG. 2.

The trunk area 68 is of sufficient size to have a well in its floor to receive the spare tire and still provide a flat floored compartment that will adequately store the luggage of several people. The usual jack and wheel changing lug wrench are clip-mounted on a side wall of the trunk area 68 as indicated in general by the reference numeral 90 in FIG. 2.

FIG. 3 is believed to clearly bring out the body rear end structural arrangement that features the pair of longitudinally spaced, arched beams 40 and 13 that support the large rear window 12. These spaced, arched beams 40, 13 give the required torsional rigidity and strength to the body rear end portion, yet they require a minimum of space. Because of this particular body structural arrangement, the clean unobstructed rear end of the vehicle body can provide the pair of connectible utility areas 16 and 68 that can be readily separated by the foldable security panel 17 when separate areas are desired. The multi-purpose garnish beam 13 that supports the trunk lid 62 and also provides the air change conduit for the rear portion of the vehicle body is believed to be a new and distinctive improvement in the body structures art.

We claim:

1. In a vehicle body having a rearwardly and downwardly sloping roof line to provide a fast back contour and including front and rear passenger seats, said rear seat having a back portion pivotally mounted in said body for movement between an upright position and a substantially horizontal position, a utility storage area normally located rearwardly of said second seat and forward of a trunk area positioned at the rear end of the vehicle body, a security panel normally providing the rear wall of said utility area and separating said utility area from said trunk area, pivot means mounting said security panel in said body for movement of said panel from an upright position to a substantially horizontal position, and latch means to selectively anchor said security panel in its upright position.

2. In a vehicle body having a rearwardly and downwardly sloping roof line to provide a fast back contour and including front and rear passenger seats, said rear seat having a back portion pivotally mounted in said body for movement between an upright position and a substantially horizontal position, a utility storage area normally located rearwardly of said second seat and forward of a trunk area positioned at the rear end of the vehicle body, a security panel normally providing the rear wall of said utility area and separating said utility area from said trunk area, a hingedly mounted trunk lid providing a closure member for said trunk area and operable to provide access to said trunk area from outside the vehicle body at the rear end thereof, pivot means mounting said security panel in said body for movement of said panel from an upright position to a substantially horizontal position, and latch means to selectively anchor said security panel in its upright position.

3. In a vehicle body having a rearwardly and downwardly sloping roof line to provide a fast back contour and including front and rear passenger seats, said rear seat having a back portion pivotally mounted in said body for movement between an upright position and a substantially horizontal position overlying the seat portion of said rear seat with the exposed back of the back portion providing a load receiving floor section extending rearwardly from the back of said front seat, a utility storage area normally located rearwardly of said second seat and forward of a trunk area positioned at the rear end of the vehicle body, said utility area having a permanent floor substantially aligned with the load receiving floor surface provided by the horizontally disposed back of the rear seat back portion, a security panel normally providing the rear wall of said utility area and separating said utility area from said trunk area, pivot means mounting said security panel in said body for movement of said panel from an upright position to a substantially horizontal position, and latch means to selectively anchor said security panel in its upright position.

4. In a vehicle body having a rearwardly and downwardly sloping roof line to provide a fast back contour and including front and rear passenger seats, said rear seat having a back portion pivotally mounted in said body for movement between an upright position and a substantially horizontal position overlying the seat portion of said rear seat with the exposed back of the back portion providing a load receiving floor section extending rearwardly from the back of said front seat, a utility storage area normally located rearwardly of said second seat and forward of a trunk area positioned at the rear end of the vehicle body, said utility area having a permanent floor substantially aligned with the load receiving floor surface provided by the horizontally disposed back of the rear seat back portion, a security panel normally providing the rear wall of said utility area and separating said utility area from said trunk area, pivot means mounting said security panel in said body for movement of said panel from an upright position to a substantially horizontal position, and latch means to selectively anchor said security panel in its upright position, said security panel when unlatched and in its horizontally disposed position forming a copalnar continuation of the floor of said utility area.

5. In a vehicle body having a rearwardly and downwardly sloping roof line to provide a fast back contour and including front and rear passenger seats, said rear seat having a back portion pivotally mounted in said body for movement between an upright position and a substantially horizontal position overlying the seat portion of said rear seat with the exposed back of the back portion providing a load receiving floor section extending rearwardly from the back of said front seat, a hingedly mounted trunk lid providing a closure member for said trunk area and operable to provide access to said trunk area from outside the vehicle body at the rear end thereof, a utility storage area normally located rearwardly of said second seat and forward of a trunk area positioned at the rear end of the vehicle body, said utility area having a permanent floor substantially aligned with the load receiving floor surface provided by the horizontally disposed back of the rear seat back portion, a security panel normally providing the rear wall of said utility area and separating said utility area from said trunk area, pivot means mounting said security panel in said body for movement of said panel from an upright position to a substantially horizontal position, and latch means to selectively anchor said security panel in its upright position, said security panel when unlatched and in its horizontally disposed position forming a coplanar continuation of the floor of said utility area.

6. In a vehicle body including front and rear passenger seats, said rear seat having a back portion pivotally mounted in said body for movement between an upright position and a substantially horizontal position, a utility storage area normally located rearwardly of said second seat and forward of a trunk area positioned at the rear end of the vehicle body, a security panel normally providing the rear wall of said utility area and separating said utility area from said trunk area, a hingedly mounted trunk lid providing a closure member for said trunk area from outside the vehicle body at the rear end thereof, pivot means mounting said security panel in said body for movement of said panel from an upright position to a substantially horizontal position, and latch means to selectively anchor said security panel in its upright position.

7. In a vehicle body having a utility area floor extending rearwardly from the back of a seat unit, said seat unit including a cushion portion and a back portion with said back portion pivotally mounted in said body for pivotal movement from a normally erect passenger supporting position to a substantially horizontal position overlying the seat cushion portion, a latch bar mounted on said seat back and extending transversely of the seat back, said bar having at least one end portion engageable with a first body mounted latching device to latch the seat back in erect position, said latch bar projecting from said seat back portion such that it serves as a bumper means to resist forward load shift across the seat back portion when said back portion is disposed in its horizontal position.

8. In a vehicle body having a utility area floor extending rearwardly from the back of a seat unit, said seat unit including a cushion portion and a back portion with said back portion pivotally mounted in said body for pivotal movement from a normally erect passenger supporting position to a substantially horizontal position overlying the seat cushion portion, a latch bar pivotally mounted on said seat back and extending transversely of the seat back, said bar having at least one end portion engageable with a first body mounted latching device to latch the seat back in erect position, said latch bar projecting from said seat back portion such that it serves as a bumper means to resist forward load shift across the seat back portion when said back portion is disposed in its horizontal position.

9. In a vehicle body having a utility area floor extending rearwardly from the back of a seat unit, said seat unit including a cushion portion and a back portion with said back portion pivotally mounted in said body for pivotal movement from a normally erect passenger supporting position to a substantially horizontal position overlying the seat cushion portion, a latch bar pivotally mounted on said back and extending transversely of the seat back, said bar having at least one end portion engageable with a first body mounted latching device to latch the seat back in erect position, said latch bar projecting from said seat back portion such that it serves as a bumper means to resist forward load shift across the seat back portion when said back portion is disposed in its horizontal position, and a second latch means mounted on said body engageable with at least one end portion of said latch bar when said seat back is disposed in its substantially horizontal position to anchor said seat back in said horizontal position.

10. In a vehicle body seating arrangement as set forth in claim 9, wherein said second latch means comprises an anchor strap.

11. In a vehicle body having an opaque roof section overlying the seating area and a large transparent window panel overlying a utility area positioned rearwardly of the seating area, said window panel extending rearwardly and downwardly from said opaque roof section and cooperating therewith to provide a fast back body roof contour, a hollow beam member extending transversely of the vehicle body at the rear end of said window panel and supporting same, and ventilation ports in said beam member having valving associated therewith to control the exhaust of air from the body interior across the interior side of said window panel and outwardly to the atmosphere.

12. In a vehicle body having an opaque roof section overlying the seating area and a large transparent window panel overlying a utility area positioned rearwardly of the seating area, said window panel extending rearwardly and downwardly from said opaque roof section and cooperating therewith to provide a fast back body roof contour, a hollow beam member extending transversely of the vehicle body at the rear end of said window panel and supporting same, ventilation ports in said beam member having valving asosciated therewith to control the exhaust of air from the body interior across the interior side of said window panel and outwardly to the atmosphere, and a panel member mounted across the rear end of said utility area to define the rear wall thereof, said panel member normally extending between said beam member and the body floor to separate said utility area from a trunk area located to the rear of said utility area, said panel member being movable into said trunk area to convert adjacent utility and trunk areas into a single unobstructed area.

13. In a vehicle body as set forth in claim 12 wherein a power driven fan means is located in said trunk area and connected by conduit means to the utility area adjacent the window panel covering said utility area whereby air can be recirculated between said trunk area and said utility area across said window panel interior side surface.

14. In a vehicle body having a floor, a rear transversely extending window spaced above said floor and an arched beam member extending transversely of the vehicle body at the rear end portion thereof, said beam member providing support for the lower edge of the body rear window and also structurally interconnecting the opposite side portions of the body rear end, a security panel hingedly mounted in the vehicle body to swing from an upstanding position extending between said beam and the underlying body floor to a substantially horizontal position overlying the vehicle body floor, said panel in its upstanding position separating the body interior to provide a trunk area to the rear of the panel and a body passenger area forwardly thereof with said panel providing the only structural element normally obstructing free movement between said two adjacent areas.

15. In a vehicle body having a floor, a rear transversely extending window spaced above said floor and an arched beam member extending transversely of the vehicle body at the rear end portion thereof, said beam member providing support for the lower edge of the body rear window and also structurally interconnecting the opposite side portions of the body rear end, a security panel hingedly mounted in the vehicle body to swing from an upstanding position extending between said beam and the underlying body floor to a substantially horizontal position overlying the vehicle body floor, said panel in its upstanding position separating the body interior to provide a trunk area to the rear of the panel and a body passenger area forwardly thereof with said panel providing the only structural element normally obstructing free movement between said two adjacent areas, and a trunk lid closure for said trunk area pivotally mounted on said beam member.

16. In a vehicle body having a floor, a rear transversely extending window spaced above said floor and an arched beam member extending transversely of the vehicle body at the rear end portion thereof, said beam member providing support for the lower edge of the body rear window and also structurally interconnecting the opposite side portions of the body rear end, a security panel hingedly mounted in the vehicle body to swing from an upstanding position extending between said beam and the underlying body floor to a substantially horizontal position overlying the vehicle body floor, said panel in its upstanding position separating the body interior to provide a trunk area to the rear of the panel and a body passenger area forwardly thereof with said panel providing the only structural element normally obstructing free movement between said two adjacent areas, said beam member having latch means thereon to retain said security panel in an upstanding position.

17. In a vehicle body having an arched beam member extending transversely of the vehicle body at the rear end portion thereof, said beam member providing support for the body rear window and also structurally interconnecting the opposite side portions of the body rear end, a security panel hingedly mounted in the vehicle body to swing from an upstanding position extending between said beam and the underlying body floor to a substantially horizontal position overlying the vehicle body floor, said panel in its upstanding position separating the body interior to provide a trunk area to the rear of the panel and a body passenger area forwardly thereof with said panel providing the only structural element normally obstructing free movement between said two adjacent areas, said beam member including conduit means providing for air interchange between said passenger area forwardly of the security panel and the exterior of the vehicle body at a location rearwardly of said security panel when said panel is in an erected upstanding position.

18. In a vehicle body having a rearwardly and downwardly sloping roof, a first inverted U-shaped beam member supporting the rear end portion of said roof at the rear of the vehicle body passenger seating area, a transparent window panel providing the rear end portion of said roof extending rearwardly from and having its forward edge portions supported by said first beam member, a second upwardly arched beam member extending transversely of the vehicle body near the rear end thereof supporting the rear edge portions of said window panel, said second beam member serving as the mounting means for a trunk lid closure for the trunk area located rearwardly of said second beam member, said second beam member also providing the support for a movable, upstanding security panel that normally depends from the second beam member to the body floor therebelow to thereby separate the body trunk area at the rear end of the body from the passenger area forwardly of the security panel.

19. In a vehicle body having a rearwardly and downwardly sloping roof, a first inverted U-shaped beam member supporting the rear end portion of said roof at the rear of the vehicle body passenger seating area, a transparent window panel providing the rear end portion of said roof extending rearwardly from and having its forward edge portions supported by said first beam member, a second upwardly arched beam member extending transversely of the vehicle body near the rear end thereof supporting the rear edge portions of said window panel, said second beam member also providing the support for a movable, upstanding security panel that normally depends from the second beam member to the body floor therebelow to thereby separate the body trunk area at the rear end of the body from the passenger area forwardly of the security panel.

20. In a vehicle body having a rearwardly and downwardly sloping roof, a first inverted U-shaped beam member supporting the rear end portion of said roof at the rear of the vehicle body passenger seating area, a transparent window panel providing the rear end portion of said roof extending rearwardly from and having its forward edge portions supported by said first beam member, a second upwardly arched beam member extending transversely of the vehicle body near the rear end thereof supporting the rear edge portions of said window panel, said second beam member also providing the support for a movable, upstanding security panel that normally depends from the second beam member to the body floor therebelow to thereby separate the body trunk area at the rear end of the body from the passenger area forwardly of the security panel, and means in said second beam member cooperating with said security panel to provide for air interchange between the exterior of said vehicle body rearwardly of said security panel and the vehicle body interior area adjacent the underside of said window panel when said security panel is in its upstanding position.

References Cited by the Examiner

UNITED STATES PATENTS

| | | | |
|---|---|---|---|
| 1,679,025 | 7/1928 | Fekete et al. | 296—24 |
| 1,894,103 | 1/1933 | Kuenzel | 296—24 |
| 3,181,911 | 5/1964 | Peras | 296—37 |

FOREIGN PATENTS 1,024,572  1/1953  France.

BENJAMIN HERSH, *Primary Examiner.*

E. E. PORTER, *Assistant Examiner.*